(12) United States Patent
Dischert et al.

(10) Patent No.: US 7,102,691 B2
(45) Date of Patent: Sep. 5, 2006

(54) METHOD AND APPARATUS FOR REMOTE USE OF PERSONAL COMPUTER

(75) Inventors: Lee R. Dischert, Burlington, NJ (US); David Noa, Doylestown, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 650 days.

(21) Appl. No.: 09/924,858

(22) Filed: Aug. 8, 2001

(65) Prior Publication Data

US 2003/0030660 A1    Feb. 13, 2003

(51) Int. Cl.
*H04N 7/16* (2006.01)

(52) U.S. Cl. ...................................... 348/552

(58) Field of Classification Search ............... 348/552, 348/553, 460, 722–723; 709/217, 203; 700/12, 700/17, 83
See application file for complete search history.

(56) References Cited

U.S. PATENT DOCUMENTS

| | | | |
|---|---|---|---|
| 4,528,643 A * | 7/1985 | Freeny, Jr. ................. | 705/52 |
| 4,570,539 A | 2/1986 | Rottstedt | |
| 4,916,631 A | 4/1990 | Crain et al. | |
| 4,953,097 A | 8/1990 | Crain et al. | |
| 5,014,218 A | 5/1991 | Crain et al. | |
| 5,528,301 A | 6/1996 | Hau et al. | |
| D378,086 S | 2/1997 | Sheehan et al. | |
| 5,675,390 A | 10/1997 | Schindler et al. | |
| 5,732,212 A | 3/1998 | Perholtz et al. | |
| 5,757,304 A | 5/1998 | Redford et al. | |
| 5,790,201 A | 8/1998 | Antos | |
| 5,812,930 A * | 9/1998 | Zavrel ......................... | 725/62 |
| 5,847,694 A | 12/1998 | Redford et al. | |
| 5,850,340 A | 12/1998 | York | |
| 5,884,096 A * | 3/1999 | Beasley et al. ............... | 710/38 |
| 5,886,753 A * | 3/1999 | Shinyagaito et al. ......... | 725/59 |
| 5,940,387 A * | 8/1999 | Humpleman ................ | 370/352 |
| 5,982,363 A * | 11/1999 | Naiff .......................... | 715/721 |
| 6,084,638 A | 7/2000 | Hare et al. | |
| 6,128,484 A * | 10/2000 | Singkornrat et al. ......... | 455/420 |
| 6,170,021 B1 * | 1/2001 | Graf ............................ | 710/15 |
| 6,181,326 B1 * | 1/2001 | Takahashi ................... | 345/158 |
| 6,208,384 B1 | 3/2001 | Schultheiss | |
| 6,219,695 B1 * | 4/2001 | Guttag et al. ............... | 709/217 |
| 6,304,895 B1 * | 10/2001 | Schneider et al. .......... | 709/203 |
| 6,360,253 B1 * | 3/2002 | Freeny ....................... | 709/217 |
| 6,522,936 B1 * | 2/2003 | Hyodo et al. ................ | 700/12 |
| 6,539,418 B1 * | 3/2003 | Schneider et al. .......... | 709/203 |
| 6,816,904 B1 * | 11/2004 | Ludwig et al. ............. | 709/226 |
| 2003/0028827 A1 * | 2/2003 | Gray ........................... | 714/46 |

* cited by examiner

*Primary Examiner*—Paulos M. Natnael
(74) *Attorney, Agent, or Firm*—RatnerPrestia

(57) ABSTRACT

A Personal Computer (PC) in a second location, provides video signals to a television monitor located in a first location. A stereo amplifies audio from the PC and provides the signal to loudspeakers in the first location. A keyboard, mouse, and controller in the first location, use infrared radiation to transmit commands. An IR receiver, in the first location, detects the commands and provides them to the PC. A communication port is used to receive the initial commands. After the initial remote commands negotiate control the input select switch interchanges the input devices of the second location with input devices of the first location. The interchange gives control of the PC to the first location keyboard, mouse and controller. A video switch/matrix in the second location is also controlled from the first location so that video is provided from the PC to the TV monitor in the first location.

16 Claims, 5 Drawing Sheets

METHOD AND APPARATUS FOR REMOTE USE OF PERSONAL COMPUTER

FIELD OF THE INVENTION

The present invention relates generally to a method and apparatus for monitoring and controlling a personal computer and more specifically to a method and apparatus for using a personal computer from a remote location using a modicum of equipment.

BACKGROUND OF THE INVENTION

Many people use their personal computer (PC) for entertainment purposes. Personal computers require a certain amount of space and are usually located in an office type environment. Due to the increasing entertainment value of the personal computer, it is often desirable to have the personal computer available for use in a more comfortable place such as a living room or bedroom.

A quandary might arise, for example, if a PC, having a digital television card, is located in a home office and the home theatre, for viewing television programs, is located in the living room. A user who desires to watch digital television (TV) by using the digital TV function of the PC has no choice but to watch it on the PC's monitor. The user can not take advantage of the digital TV function of the PC in combination with the home theatre monitor located in the living room.

Typical home audio-visual equipment systems include a number of components. For example, a radio receiver, a compact disk (CD) player, a pair of speakers, a TV, a video cassette recorder (VCR), a tape deck, and the like. These components are connected to each other via a set of wires. The radio receiver or the tuner is usually the central component of the home audio-visual system. The tuner has a number of specific inputs for coupling to the other components. The tuner has a corresponding number of control buttons or control switches that provide a limited degree of controllability and interoperability for the components. A user controls the home audio-visual system by manipulating the buttons and switches on the tuner, or alternatively, manipulating buttons on a hand-held remote control unit. These features help the user view the video and hear audio but lack the ability to integrate the innovative features of the PC. The viewer who wishes to use the personal computer's capabilities from the comfort of the living room is unable to accomplish that purpose because he or she can not input commands.

The normal hardware compliment of a PC includes a central processing unit (CPU), a keyboard, a mouse, a video display adapter, a video display monitor and a mass storage device such as a hard disk drive. Many PCs include other special purpose hardware devices such as a modem, sound card, network interface adapter card, compact disk read only memory (CDROM), digital versatile disk (DVD), and digital TV card to mention a few that may be useful for home entertainment. When a home has multiple computers, a home communications network may be one way to make all PC functions available from any computer.

An important requirement for any home network is simplicity and reliability. The home network should be easy to use, and quick to install. Some users want the functionality of a local area network (LAN) with voice networking, shared Internet access, and smart device control but many can not operate a complex system and few want to maintain a complex system.

Alternating current (AC) power lines of most homes are readily available as network cable elements. The AC lines are sometimes used as a transport medium to send and receive discrete frequency-based control, monitoring and communications messages to smart devices that manage lighting and environmental systems. They may also be used as voice-communication elements for telephone extensions, computer-modem access and intercom devices through standard electrical outlets. Applications requiring a high data rate however, can not usually make use of power line networks.

Wireless home-networking technology may be used both for line-of-sight, IR, unidirectional, hand-held controller applications and for non-line-of-sight radio frequency (RF) applications. Typical uses today are local control for VCRs, TVs and some security and alarm applications. Because of its limited bandwidth and susceptibility to RF noise, wireless home networking is considered as an inadequate home-network choice.

PCs may also be accessed and controlled remotely by other PCs using a hardware network adapter installed in the PC. This network adapter is connected directly to the other PCs or attached to a LAN. These devices typically require network adapter software to be installed to permit a device to access or control the PC. PCs can also be accessed and controlled remotely if communication software is installed in the PC and the PC has a modem. This would permit the PC to be remotely controlled over standard telephone lines or a dedicated cable by another device having access to a modem and compatible interface software. Control of the PC in this manner for a home entertainment network is not practical, as it requires an additional dedicated telephone line or other dedicated lines.

A keyboard, video and mouse (KVM) switch, such as Dakota Computer Solutions model 1010-02, exists that permits using a central KVM switch to control and access multiple PC's however, the KVM switch lacks the capability to support keyboards or other control devices existing at both the remote console and Host PC.

Another device, such as the Computer Peripheral Systems Inc., model SWTSPRRC, exists that permits a PC to be re-booted remotely however; the device does not provide the ability to substitute a video display and keyboard/mouse with the remote video display and keyboard/mouse.

SUMMARY OF THE INVENTION

A Personal Computer (PC), in a second location, provides video to a television (TV) monitor located in a first location. An amplifier coupled to loudspeakers in the first location processes sound signals provided from the PC. An input device and controller in the first location, transmits commands using an infra red (IR) transmitter. An IR receiver, in the first location, detects the commands and provides them through input select switch (ISS), in the second location, to the PC. A communication (Comm) port of the PC is used to receive the initial commands from the ISS. The initial remote commands negotiate control, causing the ISS to interchange an input device at the second location with an input device at the first location.

According to another aspect of the invention a video switch/matrix in the second location is controlled from the first location providing video signals from the PC or an alternate source through the video switch/matrix to the TV monitor in the first location.

BRIEF DESCRIPTION OF THE DRAWINGS

With these and other aspects in view, as will hereinafter more fully appear, and which are more particularly pointed out in the appended claims, reference is now made to the following description taken in connection with the accompanying drawings in which:

DETAILED DESCRIPTION OF THE INVENTION

Figure 1:
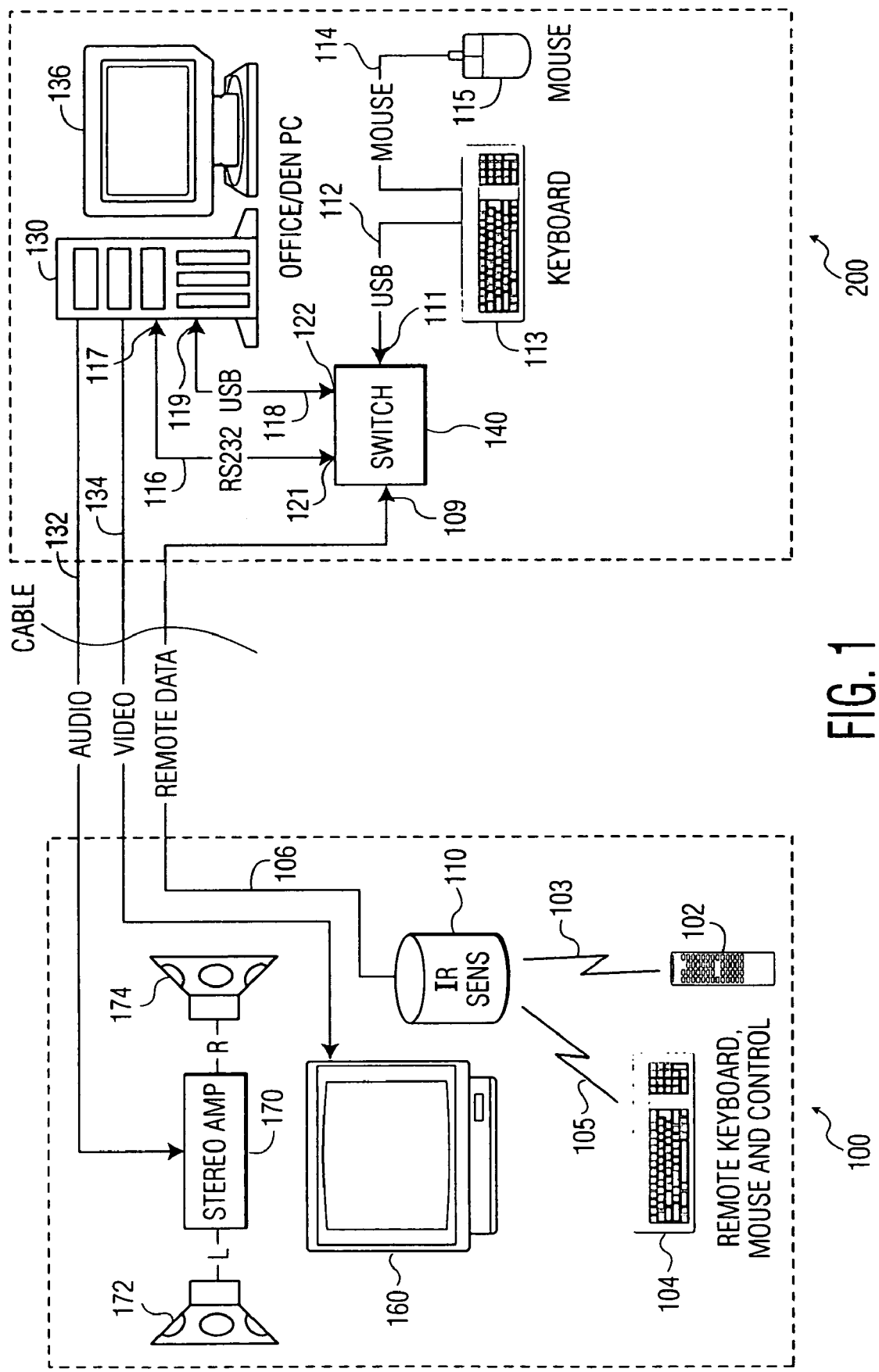
FIG. 1 is a block diagram of an exemplary embodiment of the apparatus.

FIG. 1 shows an exemplary embodiment of the invention. An IR remote control unit 102, located in a first location 100 (e.g. the viewer's living room), has a plurality of switches. The switches are configured for accepting manual depressions and are activated by a depression. In the exemplary remote control unit, the depression of a switch causes a twenty to forty kilohertz carrier signal to be modulated by a code associated with the depressed switch. The code-modulated carrier is provided to an IR emitter for modulating an IR beam from control unit 102. Transmitting the modulated carrier, rather than just modulating the IR beam directly, allows the use of a filter, tuned to the carrier frequency, in the IR receiver to distinguish the signal from noise of ambient light. There are at least two international standards used by IR transmitters to encode commands, the RC5 standard and RECS. 80 code standard. The RECS. 80 code, for example, uses pulse length modulation. Each bit to be transmitted is encoded by a high level of the duration T followed by a low level of duration 2T representing a logical '0' or 3T representing a logical '1'. The present invention is not limited to a particular type of remote control unit or to a particular method of modulation but includes these and other methods as would be known to the skilled person.

The exemplary embodiment of the invention includes a keyboard 104, located in first location 100 and having a plurality of switches that are configured to accept manual depressions, and has an IR transmitter (not shown). Keyboard 104 and remote control unit 102 have some similar functions, however keyboard 104 has more switches and provides all the functions of a typical PC keyboard such as the keyboard 113. Except for the IR transmitter of keyboard 104, both keyboard 104 and keyboard 113 may perform the same functions. Alternatively, an exemplary embodiment of the invention may use the remote control unit 102 in place of the keyboard 104. In this instance, the remote control unit 102 may include direction switches that are used to implement a the functionality of a pointer data input device such as a computer mouse.

An IR receiver 110, located in first location 100, is tuned to receive the IR transmissions of keyboard 104 and control unit 102. An optical filter within the exemplary IR receiver 110 blocks visible light but allows any IR light to pass through. Photodiodes behind the optical filter detect the IR signal and feed it through a filter tuned to the carrier for amplification. The amplified signal may be demodulated, to reverse the modulation process used to convey the switch depressions. IR receiver 110 provides an output signal via cable 106 to input port 109 of input select switch 140.

Figure 2:
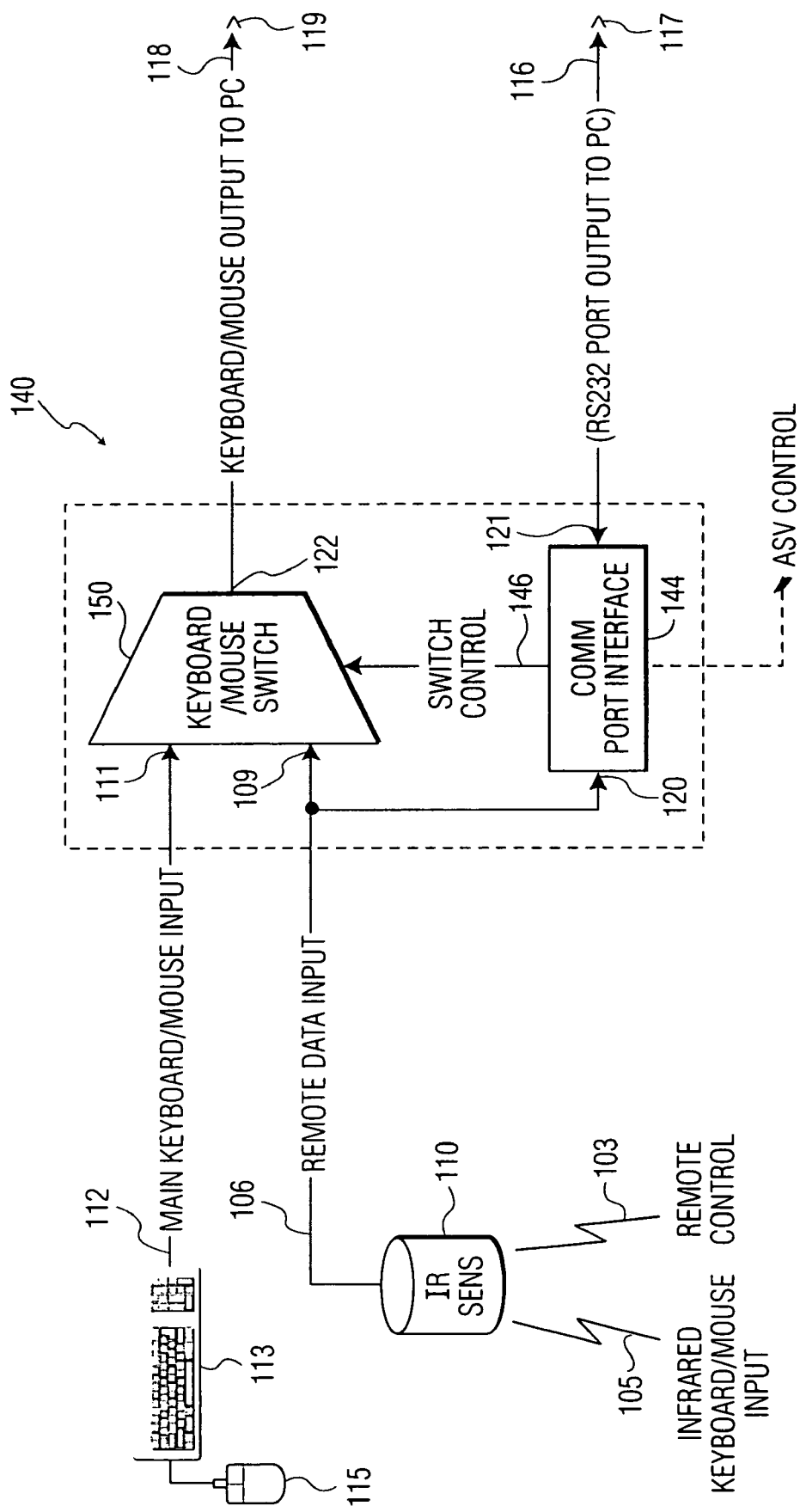
FIG. 2 is a block diagram that shows more detail of the input select switch of FIG. 1.

As shown in FIGS. 1 and 2, an exemplary input select switch (ISS) 140 located in a second location 200 (the viewer's home office) has two input ports and two output ports. The exemplary ISS 140 is a junction for the commands of second location 200 and first location 100. A first input port 109 is connected via a cable 106 to receive an output signal from IR receiver 110 comprising either the demodulated signals of controller 102 or of keyboard 104. A second input port 111 is connected, for example, via a USB cable 112 to receive the output signal of keyboard 113 and/or mouse 115.

ISS 140 has two output ports connected to a personal computer (PC) 130. The exemplary PC 130, as setup, provides both an RS232 interface and a universal serial bus (USB) interface. The exemplary system uses a Comm card (not shown) and a USB card (not shown). It is contemplated, however, that the two functions need not be on separate PC cards and that the RS232 interface and the universal serial bus (USB) interface functions may be, for example, integrated in the PC motherboard. Alternatively, it is contemplated that either the USB port or the RS232 port may be replaced by another input port such as a USB port, an RS232 port, an IEEE 1394 "Firewire" interface, a standard PC keyboard/mouse input port, a small computer systems interface (SCSI) bus or conventional PC parallel port.

A first output port 121 provides the signal from IR receiver 110 to RS232 Comm card input port 117 of PC 130, and a second output port 122, provides the signal from either keyboard 113 or IR receiver 110, depending on the switch position of ISS 140, to USB input port 119 of PC 130. Because either RS232 Comm port 117 or USB port 119 can acquire access to the input-output (I/O) bus of PC 130, arbitration is used to set priority of use between them.

Figure 5:
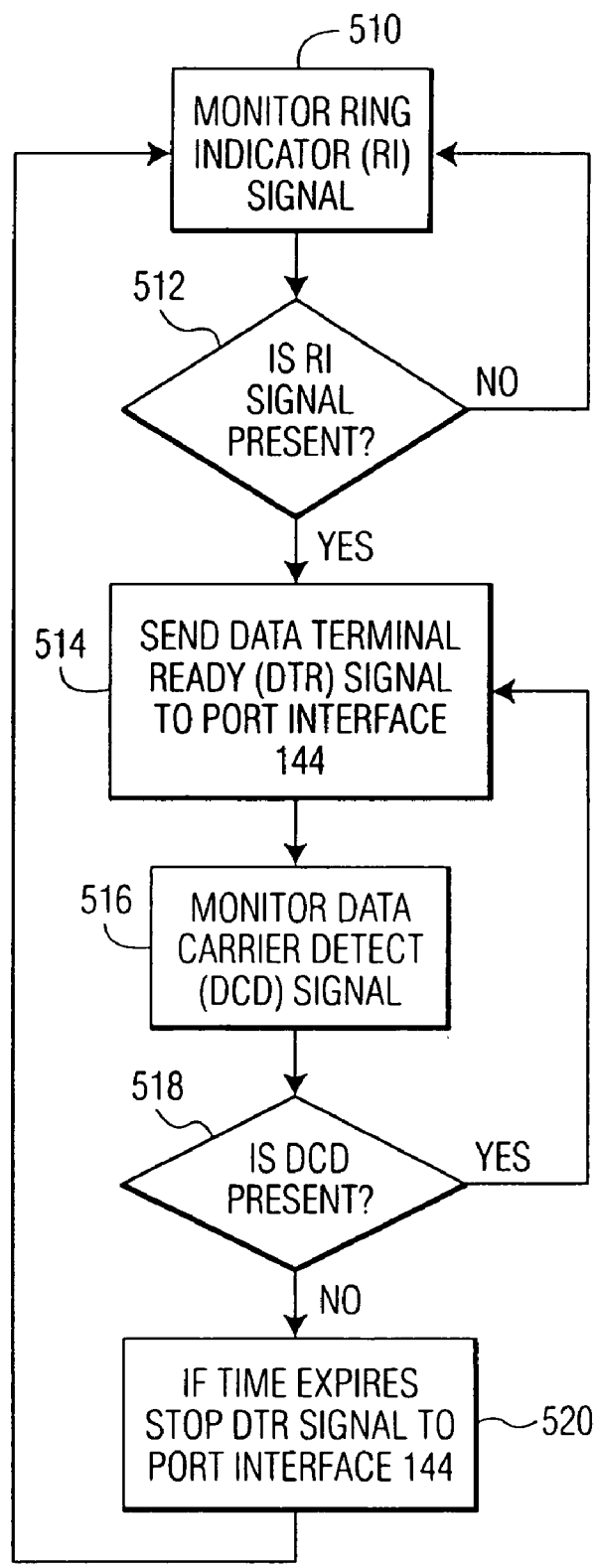
FIG. 5 is a flow diagram of the communications port control software.

FIG. 5 is a flow diagram illustrating an exemplary arbitration procedure of the Comm software of PC 130 that may be used to handle a request for control and to assign control. A request for control is made when IR receiver 110 sends a signal, such as a ring indicator (RI) signal. If the RI signal is in a logic high state at first location 100, the input device of the requester can not obtain control. Keyboard 113 can only acquire control when the RI signal of the IR receiver 110, is low. As shown in FIG. 2, Comm port interface 144 receives the RI signal on input port 120 and provides it from output port 121 to Comm port 117. The Comm card is used to determine when a control request is made to PC 130 from first location 100. The PC Comm software monitors the RI signal at steps 510 and 512. After the Comm software senses the RI signal, step 512 transfers control to step 514 which causes the RS232 Comm card to return a data terminal ready (DTR) signal via cable 116 to input 121 of the Comm port interface 144 of input select switch 140. Comm port interface 144 passes the DTR signal to keyboard/mouse switch 122 as a switch control signal enabling the signal from IR receiver 110, on input port 109, to be passed to the output port 122 of keyboard/mouse switch 150.

The algorithm shown in FIG. 5 implements a priority scheme whereby either the remote keyboard 104 or the local keyboard 113 can control the computer 130 only when the device currently in control has not sent any signal for a predetermined amount of time. It is contemplated, however, that other priority schemes may be used. For example a scheme may be implemented whereby the local keyboard always has priority over the remote keyboard and can interrupt activity initiated by the remote keyboard.

After the input devices at the first location 100 obtain control, Comm port interface 144, at steps 516 and 518 monitors the data stream from IR receiver 110 and provides a data carrier detect (DCD) signal to the RS232 Comm card to indicate data is present.

As indicated in the flow diagram of FIG. 5, the software, running in the background, monitors the presence of the DCD signal and stops the DTR signal to port interface 144 at step 520 if no DCD activity has been present for a time interval of, for example, 45 seconds. After the time has expired, the user regains control by initiating a new request to control the PC from that location. As indicated in the flow diagram of FIG. 5, the Comm software is aware of whether first location 100 or second location 200 has control. If input devices of the second location 200 have control, the arbitration procedure permits a change of control to the input devices of the first location 100 when a request for control is initiated and there has been no activity from the keyboard 113 for a suitable time interval (e.g. 45 seconds).

In the exemplary embodiment of the invention, the USB card is used to process the input data regardless of which location has control, as the output port of keyboard/mouse switch 122 is always connected through cable 118 to input port 119 of the USB card. It is noted that a second USB port may be substituted for the RS232 port or, conversely, that a second RS232 port or other input port could be substituted for the USB port.

A request to become the controlling input device can be initiated from input devices at either location 100 or location 200. The request may be enabled, for example, by: (1) keeping a key of either keyboard depressed; (2) touching a key of either keyboard when PC 130 is in screen saver mode; or (3) depressing a predetermined key or sequence of keys on the remote control unit.

The arbitration scheme described above is exemplary. It is contemplated that other arbitration schemes may be used in place of or in addition to the described scheme.

FIG. 1 further illustrates that PC 130, located in the second location 200, provides a video output signal through a video cable 134 to TV monitor 160 located in the first location 100. In the exemplary embodiment TV monitor 160 may be connected, for example, to an S-video signal output port of either a TV/FM tuner card (not shown) or a video card (not shown) of PC 130. Either card provides standard TV/S-video outputs, which provide a video output signal to a compatible TV or Monitor. In this manner TV programs for example, received through the TV/FM tuner card of PC 130 can be viewed on TV monitor 160.

TV monitor 160 may include an IR remote control receiver (not shown) and at least one remotely selectable video input connector (not shown). A user can remotely select either a broadband TV video input signal generated internally by the TV monitor 160 or the signal provided by the video output cable 134 through the video input connector. PC 130 also provides audio signals, for example, from an audio output port of the TV/tuner card through audio cable 132 to stereo amplifier 170. The exemplary stereo amplifier 170 has auxiliary input terminals that are connected to receive the audio signal from PC 130 and an input switch control on the front panel (not shown) or controlled via a remote control device (not shown). The user may listen to audio from PC 130 by selectively switching the front panel control to the position which connects the auxiliary input to the stereo amplifier or by selecting the auxiliary input using the remote control device. Left loudspeakers 172 and right loudspeaker 174 convert the audio signal into sound for listening.

Because, in the exemplary embodiment, the audio and video signals from the computer 130 are applied to auxiliary input ports of the stereo 170 and television monitor 160, the activity of a user on the computer 130 may be continually monitored from the remote locator 100 on the monitor 160 and amplifier 170 even if the viewer at location 100 does not have control of the keyboard inputs.

FIG. 2 shows functional details of ISS 140 of FIG. 1. The output signal of IR receiver 110 is connected to a first input port 109 of keyboard/mouse switch 150 and to input port 120 of Comm port interface 144. Keyboard 104 and remote control unit 102, of first location 100, are always connected via IR receiver 110, and Comm port interface 144, to input port 117 of the Comm card in PC 130 as a path through which a request for control of PC 130 can be made at all times. For example, when a user at first location 100 simultaneously depresses keyboard 104 keys "#", and "1", IR receiver 110 receives the code, decodes it and provides an output signal requesting control of PC 130 as described above with reference to FIG. 5.

Figure 3:
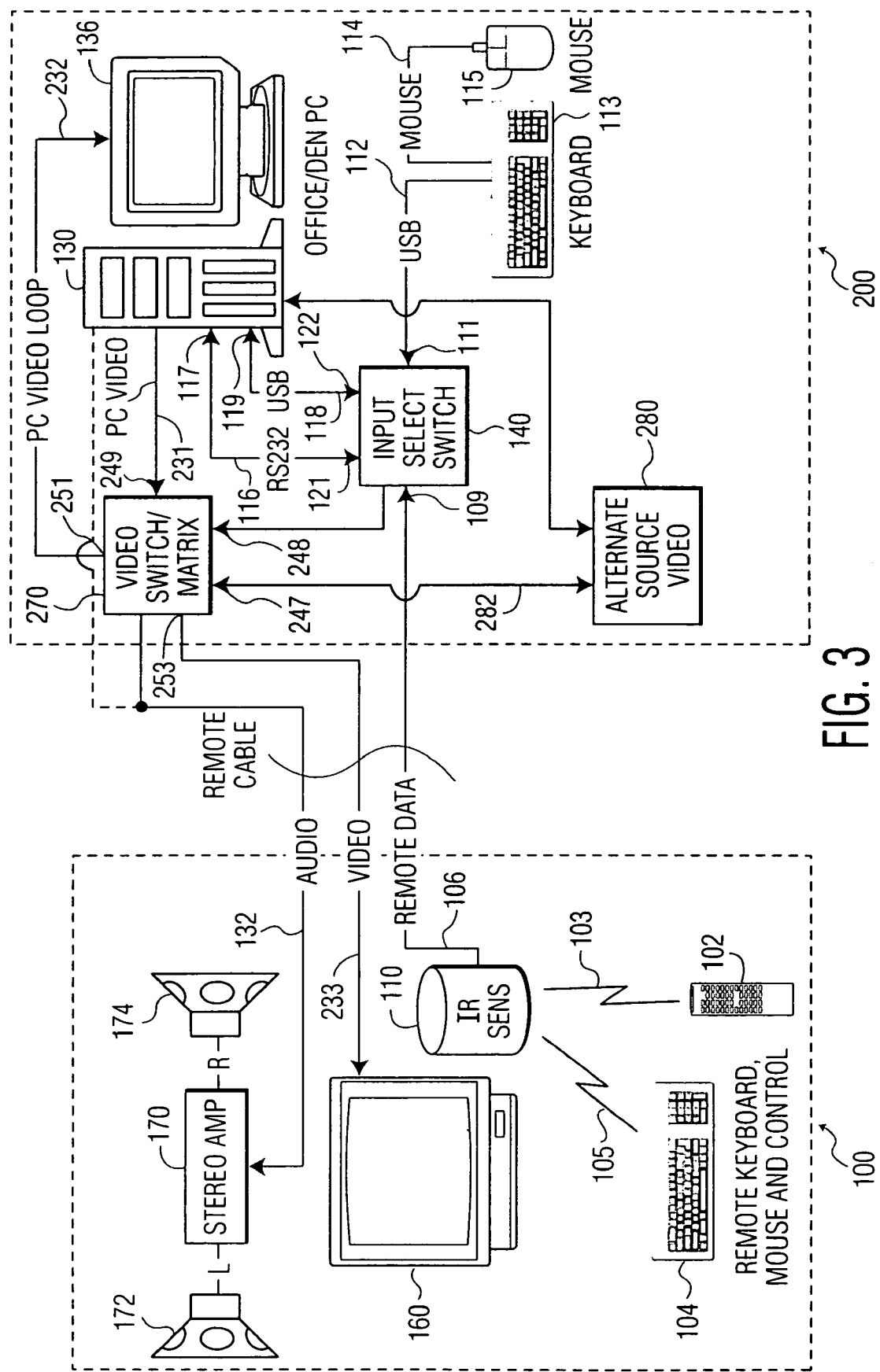
FIG. 3 is a block diagram of another exemplary embodiment of the apparatus.

FIG. 3 illustrates another exemplary embodiment of the invention, which includes a video switch/matrix 270 that allows the viewer to select a video-input source for TV monitor 160. All of the features of the previous embodiment as shown in FIG. 1 are incorporated in this embodiment with like elements having corresponding reference designations. The following description is intended to disclose the different features of this embodiment and should be read with the features of other embodiments in mind.

In addition to the ISS 140, the second embodiment includes a video switch matrix 270, that controls the video information being provided to the television monitor 160 via the video cable 223. Video switch/matrix 270 has two video signal input ports, two video signal output ports and a control signal input port. A first video signal input port 249 is connected to receive video signals from PC 130 via cable 231 and a second video signal input port 247 is connected to receive video signals from alternate source video (ASV) 280 via cable 282. ASV 280 may be, for example, a high bandwidth video output port of a high definition television (HDTV) card (not shown) of the PC 130 or it may be the output port of a digital versatile disc (DVD) player that is integrated to the computer 130. A first video signal output port 251 provides video signals to computer monitor 136 via cable 232 and a second video signal output port 253 provides video signals to TV monitor 160 via cable 233. When ISS 140 receives a video signal selection request from IR receiver 110 a control signal is generated and provided to input port 248 of video switch/matrix 270. Upon receiving the control signal, video switch/matrix 270 selectively switches video signals from either the alternate source video 280 or from PC 130 to video signal output port 253 to provide the selected video signal to TV monitor 160.

Figure 4:
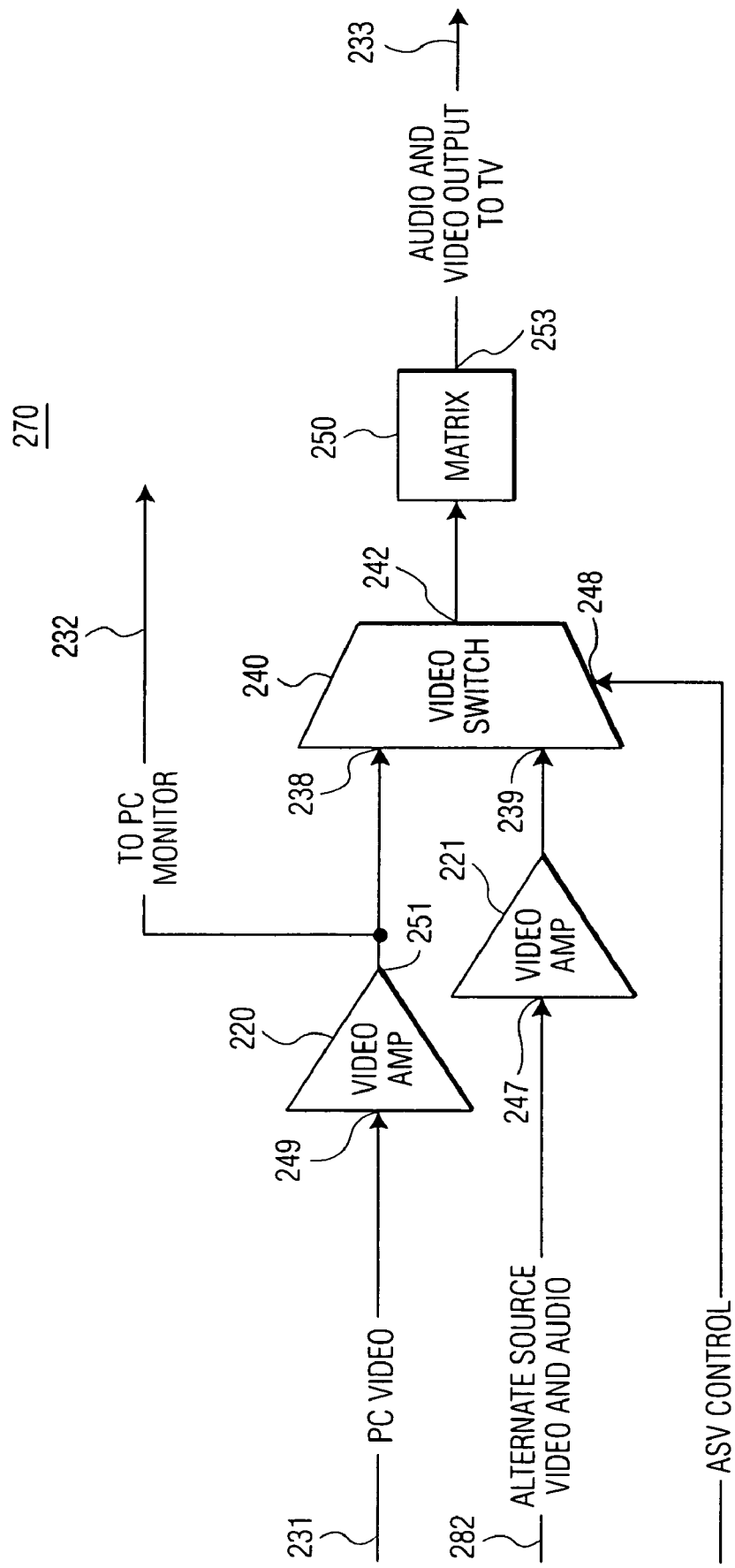
FIG. 4 is a block diagram that shows more detail of the video source/matrix of FIG. 3.

FIG. 4 is a block diagram that is useful for describing the functions of the video switch/matrix 270 of FIG. 3. Computer 130 provides an RGB analog video signal to a video amplifier 220 via cable 231. The output signal of video amplifier 220 is directly connected to PC monitor 136 and to input port 238 of video switch 240. PC monitor 136 may be, for example, a super video graphics array (SVGA) monitor. The video output signal from PC 130 can always be viewed on PC monitor 136. In addition to analog RGB video other video signal formats such as composite video, S-video and analog component video can be directly obtained from PC 130 plug-in cards such as a TV/FM tuner card. Alternate source video 280 provides a video signal via cable 282 to input port 239 of video amplifier 221. Video signals from ASV 280 can be a variety of formats such as RGB, S-video, composite video or component video (YIQ, YCbCr or YPbPr).

The video switch/matrix 270 may also include a format converter (not separately shown) that converts the video signal provided by the computer 130 to a format compatible with the television monitor 160. The format converter may be a relatively simple device that generates, for example, a NTSC composite video signal from the computer video signal or it may be a more complex device that can accept multiple computer display formats and provide multiple video display formats. An exemplary format converter is described in U.S. Pat. No. 5,528,301 to Hau et al. entitled UNIVERSAL VIDEO FORMAT SAMPLE SIZE CONVERTER, which is incorporated herein by reference for its teaching on video format conversion.

The selection of alternate source video signals occurs when IR receiver 110 sends a request through Comm port interface 144 to the PC 130 requesting that the alternate source video 280 be connected from input port 239 to output port 242 of video switch 240. A user may select a particular switch at remote control 102 for requesting playback of, for example, a DVD from the ASV 280. The request signal is sent through port interface 144 to the RS 232 port after which the Comm software returns an address signal indicative of the DVD player back through port interface 144 to the ASV 280. The exemplary ASV 280 may provide, in addition to various video sources, a decoder (not shown) and a MUX (not shown) which selects the DVD player to provide video to input 247 of the video amplifier 221. The input select switch 140 then provides a control signal 248 to the video switch matrix 270, causing it to select the signal provided by the ASV 280 to send to the video monitor 160 via the cable 233. The output port of video amplifier 221 is coupled to input port 239 of video switch 240. Alternatively, the ASV 280 may be a single device and, responsive to a selection command from the IR receiver 110, the Comm interface 144 may send a request to the computer 130 to initiate audio/video output signals from the ASV 280 and generate the ASV control signal (shown in phantom) to cause the video switch matrix to provide the output signals of the ASV 280 to the amplifier 170 and monitor 160. In another alternative embodiment, the ASV 280 may provide only the video signals and the audio signals may be provided from a sound processor (not shown) in the computer 130.

A matrix 250 is connected to receive the output signal from video switch 240 and to convert it to a format compatible with the TV monitor 160. Matrix 250 may, for example, receive component video signals and provide, for example, an NTSC standard composite video output signal. Matrix 250 can provide selectable TV output formats as a result of its ability to encode the video input signal and translate among RGB component video, S-video (Y/C), and composite video. Matrix 250 may also decode the video-input signal and translate among composite video, S-video, YCrCb component video, video and RGB component video.

It should be understood of course that the foregoing disclosure relates to only a preferred embodiment or embodiments of the invention and that numerous modifications or alterations may be made therein within departing from the spirit and the scope of the invention as set forth in the appended claims.

What is claimed:

1. A system for providing audio and video information from a second location to a first location and for controlling said audio and video information from the first location, comprising
   a computer, in the second location, including a data input port, responsive to operational commands to controllably provide video information;
   a television monitor, in the first location, coupled to the computer for selectively displaying the provided video information;
   a local keyboard, in the second location, for providing first ones of the operational commands;
   a remote control transmitter in the first location for communicating command and control signals;
   a remote control receiver, in the first location, for receiving and decoding the command and control signals from the remote control transmitter and providing second ones of the operational commands; and
   an input select switch, in the second location, having first and second input ports and a data output port, the first input port being coupled to the remote control receiver, the second input port being coupled to the local keyboard and the data output port being coupled to the data input port of the computer to provide either the first ones of the operational commands or the second ones of the operational commands to the data input port of the computer.

2. A system according to claim 1, wherein:
   the computer includes a control input port, coupled to the input select switch to receive a control request signal; and
   the input select switch includes:
   a communications port interface, coupled to the remote control receiver for receiving the second ones of the operational commands and for generating therefrom the control request signal and for receiving a select signal and generating a selection signal to cause the input select switch to provide either the first ones of the operational commands or the second ones of the operational commands to the data input port of the computer;
   a control output port coupled to the provide the control request signal to the control input port of the computer and to receive the select signal from the computer.

3. A system according to claim 2, wherein the data input port and the control input port are respectively different communications ports on the computer, each selected from a group consisting of RS-232 ports, keyboard input ports, small computer systems interface (SCSI) ports, universal serial bus (USB) ports, IEEE 1394 ports, and parallel data parts.

4. A system according to claim 2, wherein the computer includes software, coupled to receive the control request signal provided by the control output port of the input select switch, which implements a priority scheme that determines which of the first ones of the operational commands and the second ones of the operational commands are selected by the input select switch responsive to the select signal.

5. A system according to claim 1, wherein:
   the remote control transmitter includes a further computer keyboard and an infrared transmitter; and
   the remote control receiver includes an infrared receiver.

6. A system according to claim 1, wherein:
   the remote control transmitter includes a plurality of direction switches which provide direction signals and an infrared transmitter that transmits the direction signals; and the remote control receiver includes an infrared receiver and circuitry which converts the direction signals into signals compatible with a computer pointer device.

7. A system according to claim 1, further comprising:
an alternate video source which provides further video information;
a video switch, responsive to a video source control signal to provide either the video information from the computer or the further video information from the alternate video source to the television monitor;
wherein, the input select switch includes circuitry, responsive to a video source selection signal provided by the remote control receiver for generating the video source control signal.

8. A system according to claim 7, wherein the alternate video source is coupled to the computer to provide at least audio signals to the computer and the computer is configured to provide the audio signals to audio processing circuitry at the first location.

9. A system according to claim 7, wherein the alternate video source is configured to provide audio signals to the video switch and the video switch is responsive to the video source control signal to provide the audio signals to audio processing circuitry at the first location.

10. A system according to claim 7, wherein:
the alternate video source includes a plurality of video sources;
the circuitry in the input select switch sends data to the computer requesting the one of the plurality of video sources in response to a request from the remote control receiver for the one of the plurality of video sources; and
the alternate video source is responsive to a control signal from the computer to select one of the plurality of video sources to provide the further video information to the video switch.

11. A system according to claim 7, wherein the video switch includes a format converter that converts the video signals provided by the computer and by the alternate video source into a format compatible with the television monitor.

12. A method for controlling a computer at a second location from one of a remote-control transmitter at a first location and a keyboard at the second location and for providing video information from the computer to a television monitor at the first location, the computer having a data input port and a control input/output (I/O) port, the method comprising the steps of:
sensing an infrared (IR) command signal from the remote control transmitter;
generating a control request signal, responsive to the IR command signal, and sending the control request to the computer via the control I/O port;
responsive to the control request signal, receiving a select signal from the computer via the control I/O port;
directing data signals from one of the remote control transmitter or the keyboard to the data input port of the computer, exclusive of another one of the remote-control transmitter or the keyboard, responsive to the received select signal;
converting the video information to a form compatible with the television monitor; and
providing the video information to a computer monitor at the second location or a television monitor at the first location, responsive to the received select signal.

13. A method according to claim 12, further including the step of prioritizing the control request signal with input signals received by the computer from the keyboard to generate the select signal.

14. A method according to claim 12, wherein the prioritizing step generates the select signal only when the computer has not received signals from the keyboard for a predetermined interval.

15. A system for providing audio and video signals from a second location to a first location and for controlling the audio and video signals from the first location, comprising
a computer, in the second location, coupled for controllably providing video, and audio output signals;
a television monitor, in the first location, coupled to the computer for selectively displaying the video output signals provided thereby;
a local keyboard, in the second location;
a remote control transmitter in the first location for communicating command and control signals;
a remote control receiver, in the first location, for receiving and decoding transmissions from the remote control transmitter; and
an input select switch, in the second location, having a first and second input port and a first and second output port, the first input port being coupled to the remote control receiver and the second input port being coupled to the local keyboard wherein the first output port and the second output port are coupled to the computer;
an alternate video source, in the second location, coupled to the computer for receiving a selection signal from the computer; and
a video switch matrix, in the second location, having first second input ports, an output port and an enable port wherein the first input port is coupled to the computer for receiving a computer video signal, and the second input port is coupled to the alternate video source for receiving the alternate video source video signal and the enable port is coupled to the input select switch to selectively couple the video signal applied to the first input port or the video signal applied to the second input port to the output port.

16. The device of claim 15 wherein the plurality of video sources includes at least two of a DVD player, a video tuner output, a HDTV, and a video capture device.

* * * * *